(12) United States Patent
Pruetz

(10) Patent No.: US 7,721,604 B2
(45) Date of Patent: May 25, 2010

(54) MICROMECHANICAL INERTIAL SENSOR HAVING REDUCED SENSITIVITY TO THE INFLUENCE OF DRIFTING SURFACE CHARGES, AND METHOD SUITED FOR OPERATION THEREOF

(75) Inventor: Odd-Axel Pruetz, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 11/986,327

(22) Filed: Nov. 20, 2007

(65) Prior Publication Data
US 2008/0134785 A1 Jun. 12, 2008

(30) Foreign Application Priority Data
Dec. 8, 2006 (DE) .................. 10 2006 057 929

(51) Int. Cl.
*G01P 15/125* (2006.01)

(52) U.S. Cl. .................... 73/514.32; 73/514.36

(58) Field of Classification Search ........... 73/514.32, 73/514.36, 514.38, 514.29
See application file for complete search history.

(56) References Cited

U.S. PATENT DOCUMENTS

| 5,205,171 | A | * | 4/1993 | O'Brien et al. | 73/514.18 |
| 5,488,864 | A | * | 2/1996 | Stephan | 73/514.32 |
| 5,581,035 | A | * | 12/1996 | Greiff | 73/514.32 |
| 5,905,203 | A | * | 5/1999 | Flach et al. | 73/514.32 |
| 6,000,287 | A | * | 12/1999 | Menzel | 73/514.32 |
| 6,935,175 | B2 | * | 8/2005 | Eskridge et al. | 73/514.32 |
| 7,121,141 | B2 | * | 10/2006 | McNeil | 73/514.32 |

FOREIGN PATENT DOCUMENTS

| DE | 10350536 | 6/2005 |
| EP | 0773443 | 5/1997 |

* cited by examiner

Primary Examiner—Helen C. Kwok
(74) Attorney, Agent, or Firm—Kenyon & Kenyon LLP

(57) ABSTRACT

A micromechanical inertial sensor having at least one seismic mass which may be deflected relative to a substrate, and at least one electrode surface which in terms of circuitry, together with at least portions of the seismic mass forms at least one capacitor having a capacitance which is dependent on the deflection of the seismic mass. At least one additional auxiliary electrode is included which is located outside the region which forms the capacitor and which may be set at a potential that deviates from the potential of the seismic mass.

18 Claims, 2 Drawing Sheets

MICROMECHANICAL INERTIAL SENSOR HAVING REDUCED SENSITIVITY TO THE INFLUENCE OF DRIFTING SURFACE CHARGES, AND METHOD SUITED FOR OPERATION THEREOF

CARD REFERENCE

This application claims benefit under 35 U.S.C. §119 of German Patent Application No. DE 102006057929.1 filed on Dec. 8, 2006, the entirety of which is expressly incorporated herein by reference.

FIELD OF THE INVENTION

The present invention relates to a micromechanical inertial sensor having reduced sensitivity to the influence of drifting surface charges on the output signal, and a method which is suitable for operating such a sensor. Micromechanical sensors represent a key element for the measurement of accelerations perpendicular to the plane of a wafer. Such sensors may preferentially be used as so-called Z sensors in safety systems of motor vehicles as well as in consumer applications (for example, mobile telephones, video game consoles, etc.).

BACKGROUND INFORMATION

Linear accelerations are often detected with the assistance of Z sensors which are based on the use of seismic masses which are deflectably fixed and asymmetrically positioned with respect to a torsion spring (See European Patent No. 0773443 A1).

In Z sensors, the seismic mass is usually composed of a rocker structure exposed by trench etching techniques, referred to below as a rocker, which on account of the asymmetrical mass distribution of the rocker is twisted and deflected about a rotational axis, defined by the torsion spring, during an acceleration in the Z direction. Beneath the rocker which has been exposed by etching are situated electrodes which are formed by a thin conductive layer on the substrate and which together with the seismic mass represent a differential capacitor. Mechanical deflections of the rocker result in changes in capacitance of the individual capacitor regions, and may be detected as differential signals and further processed by an evaluation circuit.

For acceleration sensors it is common to check the mobility of the seismic mass and the functionality of the sensor, using a test signal, and optionally to perform calibration. Application of a test voltage to the capacitor electrodes generates an electrostatic force which results in a deflection of the seismic mass which is equivalent to the acceleration.

During processing, as the result of the technology used, charges are generated on surfaces exposed by etching. These charges are sometimes localized, and also remain in the region between the seismic mass and parallel electrode surfaces, and thus generate a permanent electrostatic force which results in faulty deflection of the seismic mass, and also results in a sensor signal, even without application of an acceleration. This "zero-point signal," also referred to as offset of the output signal, is usually compensated for in the evaluation circuit.

However, a problem arises when the charge density on relevant surfaces changes. This may be caused, for example, by high temperature, for example in the range above 100° C., or by aging processes. In such cases surface charge drift may result, which is directly associated with offset drift. Permanent monitoring and compensation would be costly and complicated. To reduce the influence of drifting surface charges on the output signal of lateral acceleration sensors, so-called X sensors, a clocked voltage is applied according to an intelligent clocking scheme to the electrodes which form the capacitor (See German Patent Application No. DE 103 50 536 B3).

However, this method requires substantial symmetry of the impinged regions as a basic geometric condition, with the result that Z sensors having an asymmetrical rocker may be used only in the region of the electrodes which are part of the differential capacitor.

However, on account of the considerable leverage it is specifically the outer surface region, which provides the asymmetry of the rocker, which greatly contributes to tipping of the rocker. If the density of the surface charge changes in this surface region, this has a particularly strong effect on the drift of the output signal, i.e., the test signal response.

SUMMARY

An object of the present invention is to provide a possibility for reducing the influence of drifting surface charges on the output signal of a micromechanical inertial sensor, in particular a Z sensor.

In accordance with an example embodiment of the present invention, a micromechanical inertial sensor having at least one seismic mass which may be deflected relative to a substrate, and at least one electrode surface which in terms of circuitry, together with at least portions of the seismic mass, forms at least one capacitor having a capacitance which is dependent on the deflection of the seismic mass, at least one additional auxiliary electrode being included which is located outside the region which forms the capacitor and which may be set at a potential that deviates from the potential of the seismic mass. As a result of this potential at the auxiliary electrode, the deflection of the seismic mass is less dependent on a changing surface density on the seismic mass.

Particularly effective use may be made of the present invention when the sensor is designed as a Z sensor and has a seismic mass in the form of an asymmetric rocker which may be rotated about a torsion spring, surface regions of the rocker which are symmetrical with respect to the rotational axis extending parallel to at least one symmetrical electrode pair which is fixedly connected to the substrate, and in terms of circuitry, together with this electrode pair forming capacitors having a capacitance that is dependent on the deflection of the seismic mass, at least one additional surface region of the rocker being situated opposite an auxiliary electrode which is located in a fixed position with respect to the substrate outside the region of the electrodes which are part of the capacitors, and which in terms of circuitry may be set at a potential that deviates from the potential of the seismic mass. In accordance with the present invention, an auxiliary electrode at a separately adjustable potential is provided, the auxiliary electrode being situated between the asymmetrical rocker and the substrate for the micromechanical system, and situated opposite surface regions of the rocker outside the regions forming the capacitors which are necessary for the acceleration measurement.

An acceleration in the Z direction is advantageously measured by evaluating the capacitance of the two symmetrically positioned capacitors, the capacitors being wired in such a way that they form a differential capacitor, and the evaluation is performed according to a differential capacitive measuring principle.

Electrostatic force effects caused by surface charges outside the region of the differential capacitor may be reduced by setting a suitable potential at the auxiliary electrode. The example method according to the present invention may be carried out in a particularly simple manner by holding the potential applied to the auxiliary electrode constant during measurement of the acceleration. It may also be advantageous when the potential is continuously applied to the auxiliary electrode. The example method according to the present invention is particularly effective when the potential applied to the auxiliary electrode is set in such a way that it differs by at least 50 mV from the potential of the seismic mass.

The voltage applied to the auxiliary electrode may advantageously be set in such a way that when there is no acceleration to be measured a minimum offset value results at the output of the Z sensor. This may be achieved, for example, by the fact that the voltage to be applied to the auxiliary electrode is set by successively determining the output signal from the Z sensor at a negative test voltage applied to the auxiliary electrode, at a positive test voltage, and in the absence of an applied test voltage, calculating a quadratic function which fits the interpolation points thus obtained and which represents the output signal of the Z sensor as a function of the voltage applied to the auxiliary electrode, determining the voltage value associated with the vertex of the parabola thus obtained, and applying this voltage value as the potential difference between the seismic mass and the auxiliary electrode.

The interfering influence of the drift of surface charges may be reduced in a particularly effective manner when, at least during measurement of the acceleration, the electrodes of the symmetrical electrode pair which is part of the capacitors are acted on by potentials clocked according to a differential capacitive measuring principle, the clock sequence including measurement clock pulses and compensation clock pulses, and the auxiliary electrode which is wired according to the present invention shielding surface regions of the rocker, which are not situated opposite the symmetrical electrodes which are part of the capacitors, as completely as possible from the substrate. The influence of variable surface charges is thereby minimized, even in regions which are not protected by an intelligent clocking scheme. The advantages of clocking of symmetrical electrode systems are described in detail in German Patent Application No. DE 103 50 536 B3, the contents of which are expressly incorporated herein by reference in its entirety.

Good efficiency of the system according to the present invention may be achieved when the surface of the auxiliary electrode is at least 80% of the substrate-side surface of the seismic mass which does not extend opposite the electrodes which are part of the capacitors.

BRIEF DESCRIPTION OF THE DRAWINGS

The method according to the present invention is explained in greater detail with reference to one exemplary embodiment.

DETAILED DESCRIPTION OF EXAMPLE EMBODIMENTS

Figure 1:
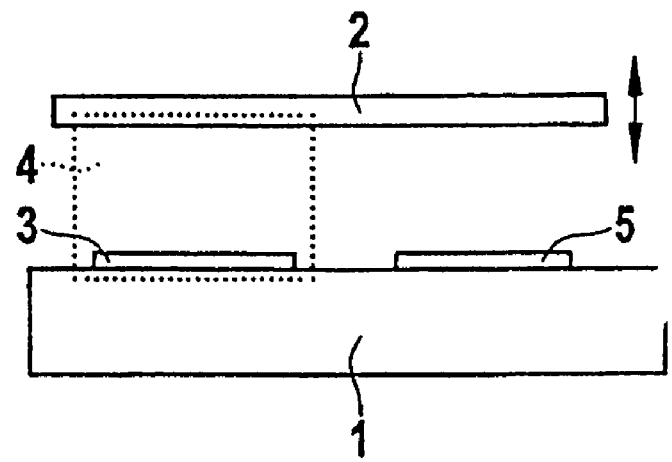
FIG. 1 shows a schematic illustration of a sensor according to the present invention.

FIG. 1 shows a schematic illustration of a micromechanical inertial sensor according to the present invention. This micromechanical inertial sensor includes a substrate 1, a seismic mass 2 which may be deflected relative to the substrate, and a flat electrode 3 which in terms of circuitry, together with portions of seismic mass 2, forms in a first region 4 at least one capacitor having a capacitance which depends on the deflection of the seismic mass. At least one additional auxiliary electrode 5 is also included, which is located outside region 4 which forms the capacitor, to which a potential that deviates from the potential of the seismic mass may be applied.

Figure 2:
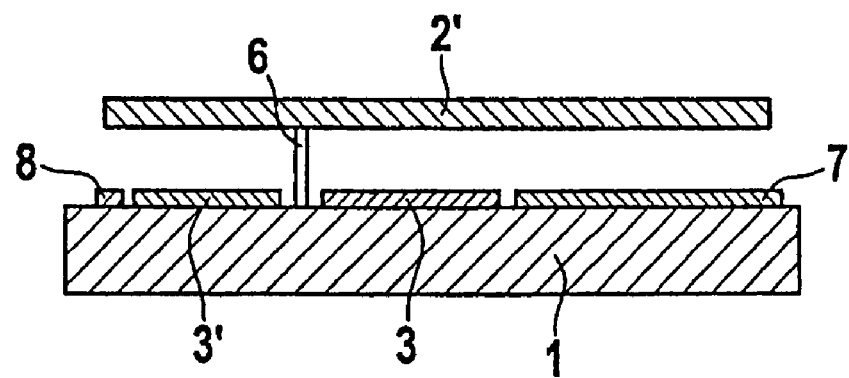
FIG. 2 shows a schematic sectional illustration of a conventional Z sensor.

FIG. 2 shows a schematic sectional illustration of a conventional Z sensor. This Z sensor includes an asymmetrical rocker 2' as a seismic mass which, via a torsion spring 6, is mechanically connected to a substrate 1 made of polycrystalline silicon. Rocker 2' extends at a sufficient distance parallel to substrate 1 in order to be deflected perpendicular to substrate 1 when an acceleration to be measured occurs. Electrodes are situated on substrate 1 in the region below rocker 2'. A symmetrical pair of electrodes 3, 3' is situated on each side of torsion spring 6. Each of these electrodes 3, 3' together with the surface region of rocker 2' situated opposite the electrodes forms a plate capacitor which may be used as a measuring capacitor and whose capacitance depends on the particular distance between rocker 2' and electrodes 3, 3'. The symmetrical electrode configuration enables wiring and evaluation as a differential capacitor, an inclination of the seismic mass, i.e., rocker 2', being converted to a differential signal between the two partial capacitances. As a result of the circuitry, rocker 2' is at an average potential, the so-called mid-ground potential, whereas substrate 1 is held at ground. To avoid short-circuiting as the result of contact between rocker 2' and substrate 1, which may occur if the sensor overloads, additional electrodes 7, 8 which are held at the potential of rocker 2' are provided on substrate 1 for shielding the edge regions of rocker 2'. Electrodes 3, 3', 7, 8 are insulated with respect to substrate 1.

Figure 3:
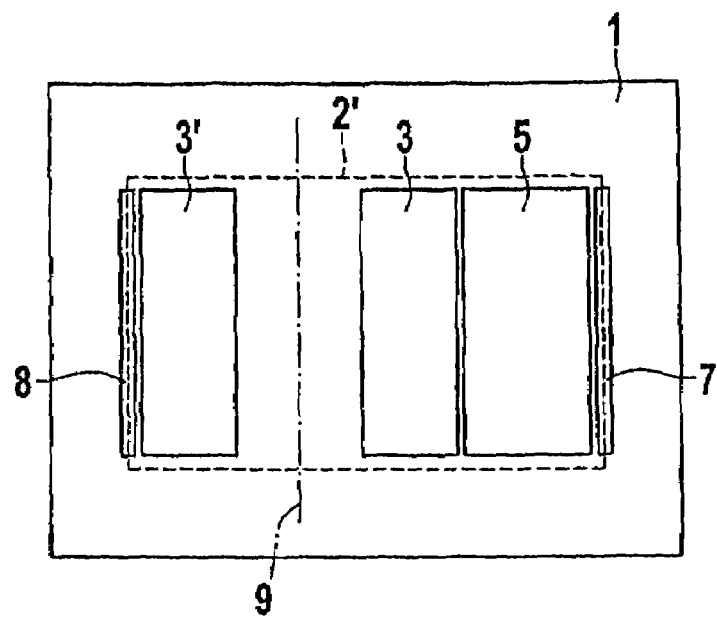
FIG. 3 shows an electrode system of a Z sensor according to the present invention.

FIG. 3 shows an electrode system of a Z sensor according to an example embodiment of the present invention. The contour of rocker 2' is indicated by dashed lines. The symmetrical configuration of electrodes 3, 3', which represent customary components of the differential capacitor, has remained unchanged. Connected to this symmetrically configured region is an auxiliary electrode 5 at a separately settable potential, located between rocker 2' and substrate 1 and situated opposite from surface regions of rocker 2' outside the regions which are part of the capacitors, the regions generally being delimited by electrodes 3, 3'. Below the outermost edge regions of rocker 2' are located electrodes 7, 8 at mid-ground potential which provide protection from short-circuiting and discharging. These electrodes are matched to the rectangular shape of rocker 2', and in the present example, together with fixed rotational axis 9 prevent contact between rocker 2' and surfaces which are at a potential that deviates from the rocker potential. Regardless of the specific rocker geometry, however, in regions of the micromechanical structure which may act as an impact stop for seismic mass 2, electrodes 7, 8 are provided which support seismic mass 2 in the event of impact and which in terms of circuitry are at the same potential as the seismic mass.

According to the present invention, auxiliary electrode 5 is set at a direct potential. This direct potential corresponds to the magnitude of the mid-ground potential at which edge electrodes 7, 8 and rocker 2' are set, in addition to a voltage (referred to below as compensation voltage) which corresponds to the magnitude of the voltage which is equivalent to the surface charge, but having the opposite algebraic sign. The voltage is adjusted by compensation in the control and evaluation circuit of the sensor, usually in the form of an ASIC. It has been shown that via a one-time compensation it is also possible to greatly reduce the sensitivity of the output signal from a sensor according to the present invention to the influence of drifting surface charges, even when after drift processes have occurred a full compensation of the offset is no longer provided by the initially set compensation voltage.

Figure 4:
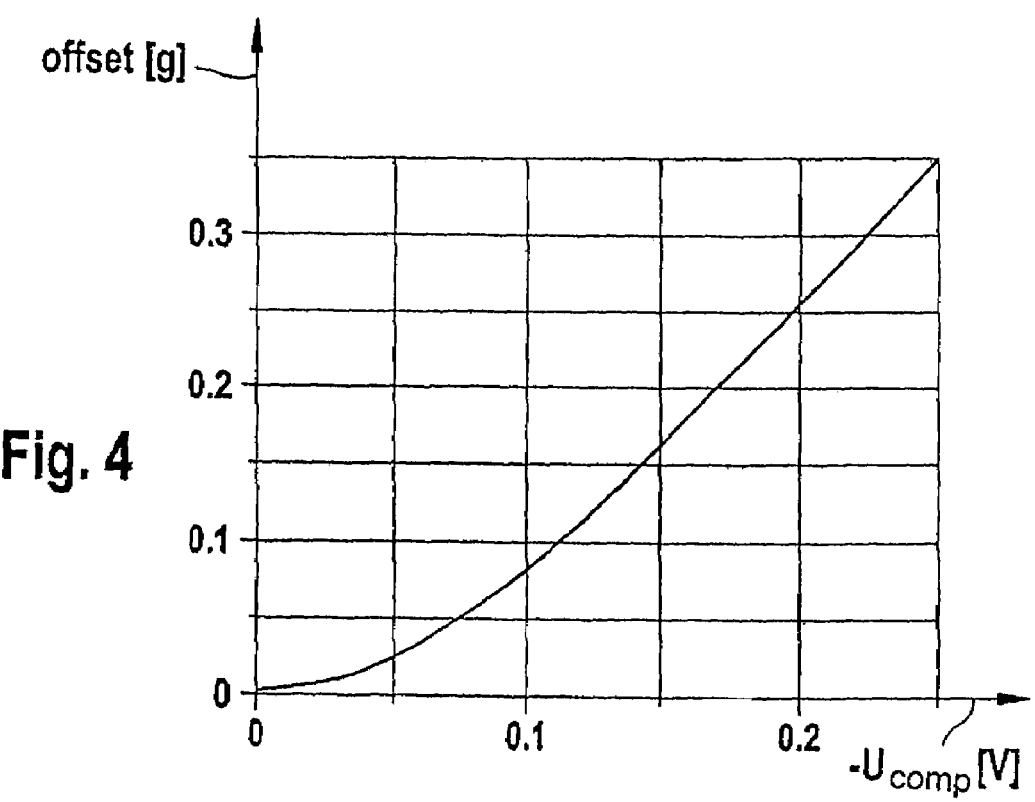
FIG. 4 shows a simulated offset/surface charge characteristic curve of a Z channel of an micromechanical acceleration sensor operated without compensation.

The reason is illustrated in FIG. 4. FIG. 4 shows a simulated offset/surface charge characteristic curve of a Z channel of a micromechanical acceleration sensor according to an example embodiment of the present invention operated without compensation. In the figure, the offset of the previously evaluated output signal in g is plotted against a voltage which represents a measure of the surface charge density on the seismic mass, and with the opposite algebraic sign corresponds to the voltage that would be necessary in each case for complete compensation of the offset at the auxiliary electrode. This voltage is referred to below as $-U_{comp}$. It is clearly shown that there is no linear relationship between the two values. Rather, the slope of the characteristic curve near the zero point is very flat, and increases with increasing surface charge density. If effectively determinable voltage $-U_{comp}$ changes by a given value at a high surface charge density as the result of surface charge drift, this results in a much greater change in the offset of the output signal than when, for a lower initial surface charge density, the same change in $-U_{comp}$ occurs as the result of drift processes. The same applies for a test signal response of a sensor according to the present invention. By application of a fixed compensation voltage, any given working points on this characteristic curve having an initial surface charge may be shifted into a flat region of the characteristic curve. A subsequent change in the surface charge density as the result of drift processes is then much less noticeable as offset drift, and frequently may be tolerated without readjusting the compensation voltage.

It has been shown that surface charge drifts which are a fraction of the initial surface charge are realistic during use of micromechanical acceleration sensors. In many cases this has been unacceptable in light of increasing demands on the accuracy and service life stability, and required a process step of artificial aging over several days and at high temperatures, which entailed high costs and the risk of other damage to sensors treated in this manner. This step may be omitted for sensors compensated according to the present invention. It has been shown that even at extraordinarily high drift rates not expected during normal operation, the resulting offset drift is significantly reduced compared to uncompensated sensors. For realistic drift rates of [ ], offset drift and changes in the test signal response of sensors according to the present invention are within required tolerances.

As the result of disconnecting auxiliary electrode 5 from the mid-ground potential, the parasitic capacitance between the conductor plane and substrate 1 is also greatly reduced, which, in particular for use of so-called sigma-delta converters, results in a greatly improved noise response of circuit systems having sensors according to the present invention.

LIST OF REFERENCE NUMERALS

1 Substrate
2 Seismic mass
2' Rocker*
3 Electrode*
3' Electrode
4 Capacitor region
5 Auxiliary electrode
6 Torsion spring
7 Edge electrode*
8 Edge electrode*
9 Rotational axis

What is claimed is:

1. A micromechanical inertial sensor, comprising:
at least one seismic mass which may be deflected relative to a substrate;
at least one electrode surface which in terms of circuitry, together with at least portions of the seismic mass, forms at least one capacitor having a capacitance which is dependent on a deflection of the seismic mass; and
at least one additional auxiliary electrode located outside a region which forms the capacitor and which may be set at a potential that deviates from a potential of the seismic mass, wherein the potential of the auxiliary electrode is set by an output of the sensor when a test voltage is applied to the auxiliary electrode.

2. The sensor as recited in claim 1, wherein the sensor is designed as a Z sensor and the seismic mass is in the form of an asymmetric rocker which may be rotated about a torsion spring, surface regions of the rocker which are symmetrical with respect to a rotational axis extending parallel to at least one symmetrical electrode pair which is fixedly connected to the substrate, and in terms of circuitry, together with the electrode pair, forming capacitors having a capacitance which is dependent on the deflection of the seismic mass, at least one additional surface region of the rocker being situated opposite the at least one auxiliary electrode which is located in a fixed position with respect to the substrate outside a region of the electrodes which are part of the capacitors, and which in terms of circuitry may be set at a potential that deviates from the potential of the seismic mass.

3. The sensor as recited in claim 1, wherein in regions of the micromechanical sensor which may act as a stop for the seismic mass, additional electrodes are provided which support the seismic mass in an event of impact and which in terms of circuitry are at a same potential as the seismic mass.

4. The sensor as recited in claim 2, wherein a surface of the auxiliary electrode is at least 80% of a substrate-side surface of the seismic mass which does not extend opposite the electrodes that are part of the capacitors.

5. A method for reducing an influence of drifting surface charges on an output signal from a micromechanical Z sensor, comprising:
using a seismic mass in a form of an asymmetric rocker which may be rotated about a torsion spring, surface regions of the rocker which are symmetrical with respect to a rotational axis extending parallel to at least one symmetrical electrode pair, and in terms of circuitry together with electrode pair forming capacitors having a capacitance that is dependent on a deflection of the seismic mass, and at least one additional surface region of the rocker being situated opposite an auxiliary electrode which is located in a fixed position with respect to a substrate outside a region of the electrodes that are part of the capacitors;

measuring an acceleration in a Z direction by evaluating the capacitance of at least one of the capacitors; and setting, at least during the measurement of acceleration, the auxiliary electrode at a potential that deviates from a potential of the seismic mass, wherein the potential of the auxiliary electrode is set by an output of the Z sensor when a test voltage is applied to the auxiliary electrode.

6. The method as recited in claim 5, wherein the acceleration in the Z direction is measured by evaluating the capacitance of the capacitors, the capacitors being positioned symmetrically and connected a manner to form a differential capacitor, and the evaluation being performed according to a differential capacitive measuring principle.

7. The method as recited in claim 5, wherein the potential is continuously applied to the auxiliary electrode, or is held constant at least during measurement of the acceleration.

8. The method as recited in claim 7, wherein the potential applied to the auxiliary electrode is set in such a way that the potential applied to the auxiliary electrode differs by a voltage of at least 50 mV from the potential of the seismic mass.

9. The method as recited in claim 8, wherein the potential applied to the auxiliary electrode is set in such a way that when there is no effect from the acceleration to be measured, a minimum offset value results at the output of the Z sensor.

10. The method as recited in claim 5, wherein at least during measurement of the acceleration, the electrodes of the symmetrical electrode pair which is part of the capacitors are acted on by potentials clocked according to a differential capacitive measuring principle, the clock sequence including measurement clock pulses and compensation clock pulses.

11. The method as recited in claim 5, wherein the potential of the auxiliary electrode is set by calculating a quadratic function that fits a plurality of interpolation points, the points representing the output signal of the Z sensor as a function of the potential of the auxiliary electrode.

12. The method as recited in claim 5, wherein the acceleration in the Z direction is measured by evaluating the capacitance of the capacitors, the capacitors being positioned symmetrically and connected in a manner to form a differential capacitor, and the evaluation being performed according to a differential capacitive measuring principle, wherein the potential is continuously applied to the auxiliary electrode, or is held constant at least during measurement of the acceleration, wherein the potential applied to the auxiliary electrode is set in such a way that the potential applied to the auxiliary electrode differs by a voltage of at least 50 mV from the potential of the seismic mass, and wherein the potential applied to the auxiliary electrode is set so that when there is no effect from the acceleration to be measured, a minimum offset value results at the output of the Z sensor.

13. The method as recited in claim 12, wherein the potential of the auxiliary electrode is set by calculating a quadratic function that fits a plurality of interpolation points, the points representing the output signal of the Z sensor as a function of the potential of the auxiliary electrode.

14. The method as recited in claim 13, wherein at least during measurement of the acceleration, the electrodes of the symmetrical electrode pair which is part of the capacitors are acted on by potentials clocked according to a differential capacitive measuring principle, the clock sequence including measurement clock pulses and compensation clock pulses.

15. The sensor as recited in claim 1, wherein the potential of the auxiliary electrode is set by calculating a quadratic function that fits a plurality of interpolation points, the points representing the output signal of the sensor as a function of the potential of the auxiliary electrode.

16. The sensor as recited in claim 1, further comprising:
a control and evaluation circuit to set the potential of the auxiliary electrodes.

17. The sensor as recited in claim 1, wherein the sensor is designed as a Z sensor and the seismic mass is in the form of an asymmetric rocker which may be rotated about a torsion spring, surface regions of the rocker which are symmetrical with respect to a rotational axis extending parallel to at least one symmetrical electrode pair which is fixedly connected to the substrate, and in terms of circuitry, together with the electrode pair, forming capacitors having a capacitance which is dependent on the deflection of the seismic mass, at least one additional surface region of the rocker being situated opposite the at least one auxiliary electrode which is located in a fixed position with respect to the substrate outside a region of the electrodes which are part of the capacitors, and which in terms of circuitry may be set at a potential that deviates from the potential of the seismic mass, wherein in regions of the micromechanical sensor which may act as a stop for the seismic mass, additional electrodes are provided which support the seismic mass in an event of impact and which in terms of circuitry are at a same potential as the seismic mass, and wherein a surface of the auxiliary electrode is at least 80% of a substrate-side surface of the seismic mass which does not extend opposite the electrodes that are part of the capacitors.

18. The sensor as recited in claim 17, wherein the potential of the auxiliary electrode is set by calculating a quadratic function that fits a plurality of interpolation points, the points representing the output signal of the sensor as a function of the potential of the auxiliary electrode.

* * * * *